US012762591B2

(12) United States Patent
Scott et al.

(10) Patent No.: US 12,762,591 B2
(45) Date of Patent: Oct. 13, 2026

(54) SYSTEM AND METHOD FOR REAL-TIME GENERATION AND OPTIMIZATION OF PERSONALIZED CAUSE-ALIGNED CONTENT

(71) Applicant: Love Little Light LLC, Dover, DE (US)

(72) Inventors: James Scott, New York, NY (US); Ami Shah, New York, NY (US)

(73) Assignee: Love Little Light LLC, Dover, DE (US)

( * ) Notice: Subject to any disclaimer, the term of this patent is extended or adjusted under 35 U.S.C. 154(b) by 0 days.

(21) Appl. No.: 19/285,297

(22) Filed: Jul. 30, 2025

(65) Prior Publication Data

US 2026/0044881 A1 Feb. 12, 2026

Related U.S. Application Data

(60) Provisional application No. 63/680,871, filed on Aug. 8, 2024.

(51) Int. Cl.

| | |
|---|---|
| ***G06Q 30/0241*** | (2023.01) |
| ***G06N 20/00*** | (2019.01) |
| ***G06Q 30/0242*** | (2023.01) |
| ***G06Q 30/0251*** | (2023.01) |
| ***G06Q 30/0279*** | (2023.01) |

(52) U.S. Cl.
CPC ......... *G06Q 30/0276* (2013.01); *G06N 20/00* (2019.01); *G06Q 30/0246* (2013.01); *G06Q 30/0271* (2013.01); *G06Q 30/0279* (2013.01)

(58) Field of Classification Search
CPC .................... G06N 20/00; G06Q 30/02–0279
See application file for complete search history.

(56) References Cited

U.S. PATENT DOCUMENTS

2013/0325550 A1* 12/2013 Varghese ............... G06Q 50/01
705/7.31
2019/0121916 A1 4/2019 Bennun et al.
2019/0188658 A1* 6/2019 Largura ............... G06Q 20/085
2025/0322324 A1* 10/2025 Bjontegard ............ G06F 16/93

FOREIGN PATENT DOCUMENTS

KR 20200038216 A 4/2020
WO 2018104581 A1 6/2018

OTHER PUBLICATIONS

"Do Not Track", Electronic Frontier Foundation, www.eff.org, Feb. 26, 2014.*

* cited by examiner

*Primary Examiner* — Raquel Alvarez
(74) *Attorney, Agent, or Firm* — Jason A. Smith; Shumaker, Loop & Kendrick, LLP

(57) ABSTRACT

The present disclosure provides a computer-implemented system and method for creating and serving cause-aligned digital personalized content that convert user engagement into real-time brand-funded donations. The system employs machine learning algorithms to match brands with compatible causes and relevant users, generating personalized advertisements in real-time. A key feature is the interactive AdsUp button, which triggers micro-donations from brands to causes based on user engagement. The system incorporates a continuous learning module that refines the machine learning model using real-time user engagement data, ensuring ongoing improvement in targeting personalized content and effectiveness.

13 Claims, 5 Drawing Sheets

SYSTEM AND METHOD FOR REAL-TIME GENERATION AND OPTIMIZATION OF PERSONALIZED CAUSE-ALIGNED CONTENT

CROSS REFERENCE TO RELATED APPLICATIONS

This application claims priority to U.S. Application No. 63/680,871, titled System and Method for Unified Campaign Management and User Engagement, filed Aug. 8, 2024, which is hereby incorporated by reference in its entirety.

FIELD OF INVENTION

The present disclosure relates to interactive digital systems, and more particularly to a real-time personalized content generation system that aligns brand values with user-relevant charitable causes to enhance engagement and social impact.

BACKGROUND

A technical challenge in modern digital content delivery systems is the real-time generation of personalized, cause-aligned content while concurrently processing high-volume, heterogeneous data streams from brands, charities/causes, and users. These systems must handle thousands of content impression requests per second, each requiring the retrieval and analysis of diverse data types including structured brand and charity profiles, unstructured mission statements, visual media assets, and granular user interaction logs. The complexity is further compounded by the need to ensure brand-cause compatibility, charity-consumer alignment, and brand-consumer relevance in real-time, all while maintaining user privacy and data security.

Current digital delivery systems typically employ separate processing pipelines for brand, charity, and user data, followed by a computationally intensive merge step to consolidate results. This approach often involves scanning extensive tables and loading large feature vectors into memory. To mitigate latency issues, many systems resort to batch-oriented approaches, pre-computing content recommendations at fixed intervals and storing them in lookup tables for rapid serving. Some advanced systems use basic machine learning models for matching, but these are often limited in their ability to process and interpret complex, multimodal data in real-time. These current solutions face several challenges and shortcomings. The batch-oriented approach leads to outdated recommendations that cannot adapt quickly to new user interests or emerging charitable causes. Real-time model updates become prohibitively expensive as data volumes grow, resulting in stale content delivery. The lack of integrated, continuously learning architecture leads to inefficient use of computer resources, poor scalability across distributed nodes, and delivery of content that is neither timely nor contextually relevant. Moreover, existing systems struggle to effectively balance the alignment between brands, causes, and consumers while maintaining the speed necessary for real-time digital content serving.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

According to an aspect of the present disclosure, a method for real-time generation of personalized content for a user associated with a user identifier is provided. The method includes receiving a request comprising a brand identifier and the user identifier. The method includes retrieving, from a pre-computed low-latency lookup table, a plurality of cause records associated with the brand identifier, wherein each cause record in the low-latency lookup table is associated with a brand-cause compatibility score exceeding a predetermined threshold. The method includes computing, using a machine learning model, a plurality of cause-user relevance scores, wherein each cause-user relevance score represents a relevance between the user identifier and a respective cause record from the retrieved plurality of cause records. The method includes selecting a target cause record from the plurality of cause records, wherein the target cause record has the highest cause-user relevance score among the plurality of cause-user relevance scores, and wherein the highest cause-user relevance score exceeds the second predetermined threshold. The method includes generating, in real-time, a personalized advertisement by combining brand related content associated with the brand identifier and cause related content associated with the target cause record. The method includes transmitting the personalized advertisement for rendering on a device associated with the user identifier. The method includes tracking user engagement data associated with the personalized advertisement. The method includes continuous training on the machine learning model based on the user engagement data to refine at least the cause-user relevance scores and brand-cause compatibility score.

According to another aspect of the present disclosure, a system for real-time generation of personalized content for a user associated with a user identifier is provided. The system comprises a processor and a memory storing instructions that, when executed by the processor, cause the system to: receiving a request comprising a brand identifier and the user identifier. The method includes retrieving, from a pre-computed low-latency lookup table, a plurality of cause records associated with the brand identifier, wherein each cause record in the low-latency lookup table is associated with a brand-cause compatibility score exceeding a predetermined threshold. The method includes computing, using a machine learning model, a plurality of cause-user relevance scores, wherein each cause-user relevance score represents a relevance between the user identifier and a respective cause record from the retrieved plurality of cause records. The method includes selecting a target cause record from the plurality of cause records, wherein the target cause record has the highest cause-user relevance score among the plurality of cause-user relevance scores, and wherein the highest cause-user relevance score exceeds the second predetermined threshold. The method includes generating, in real-time, a personalized advertisement by combining brand related content associated with the brand identifier and cause related content associated with the target cause record. The method includes transmitting the personalized advertisement for rendering on a device associated with the user identifier. The method includes tracking user engagement data associated with the personalized advertisement. The method includes continuous training on the machine learning model based on the user engagement data to refine at least the cause-user relevance scores and brand-cause compatibility score.

The foregoing general description of the illustrative embodiments and the following detailed description thereof are merely exemplary aspects of the teachings of this disclosure and are not restrictive.

BRIEF DESCRIPTION OF THE DRAWINGS

The foregoing detailed description of embodiments is better understood when read in conjunction with the appended drawings. For the purpose of illustrating of the present subject matter, an example of a construction of the present subject matter is provided as figures, however, the invention is not limited to the specific method and system for an A.I-driven platform for unified campaign management, automating user engagement, transaction processing, and data tracking across digital platforms is disclosed in the document and the figures.

The present subject matter is described in detail with reference to the accompanying figures. In the figures, the leftmost digit(s) of a reference number identifies the figure in which the reference number first appears. The same numbers are used throughout the drawings to refer to various features of the present subject matter.

The figure depicts an embodiment of the present disclosure for purposes of illustration only. One skilled in art will readily recognize from the following discussion that alternative embodiments of the structures and methods illustrated herein may be employed without departing from the principles of the disclosure described herein.

DETAILED DESCRIPTION

Some embodiments of this disclosure, illustrating all its features, will now be discussed in detail. The terms used in the claims like "receive", "extract", "generate", "analyze", "generate", "transmit", "track", "implement" and other forms thereof, are intended to be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any system and methods similar or equivalent to those described herein can be used in the practice or testing of embodiments of the present disclosure, the exemplary, system and methods are now described.

The disclosed embodiments are merely examples of the disclosure, which may be embodied in various forms. Various modifications to the embodiment will be readily apparent to those skilled in the art and the generic principles herein may be applied to other embodiments. However, one of the ordinary skills in art will readily recognize that the present disclosure is not intended to be limited to the embodiments described but is to be accorded the widest scope consistent with the principles and features described herein.

Figure 1:
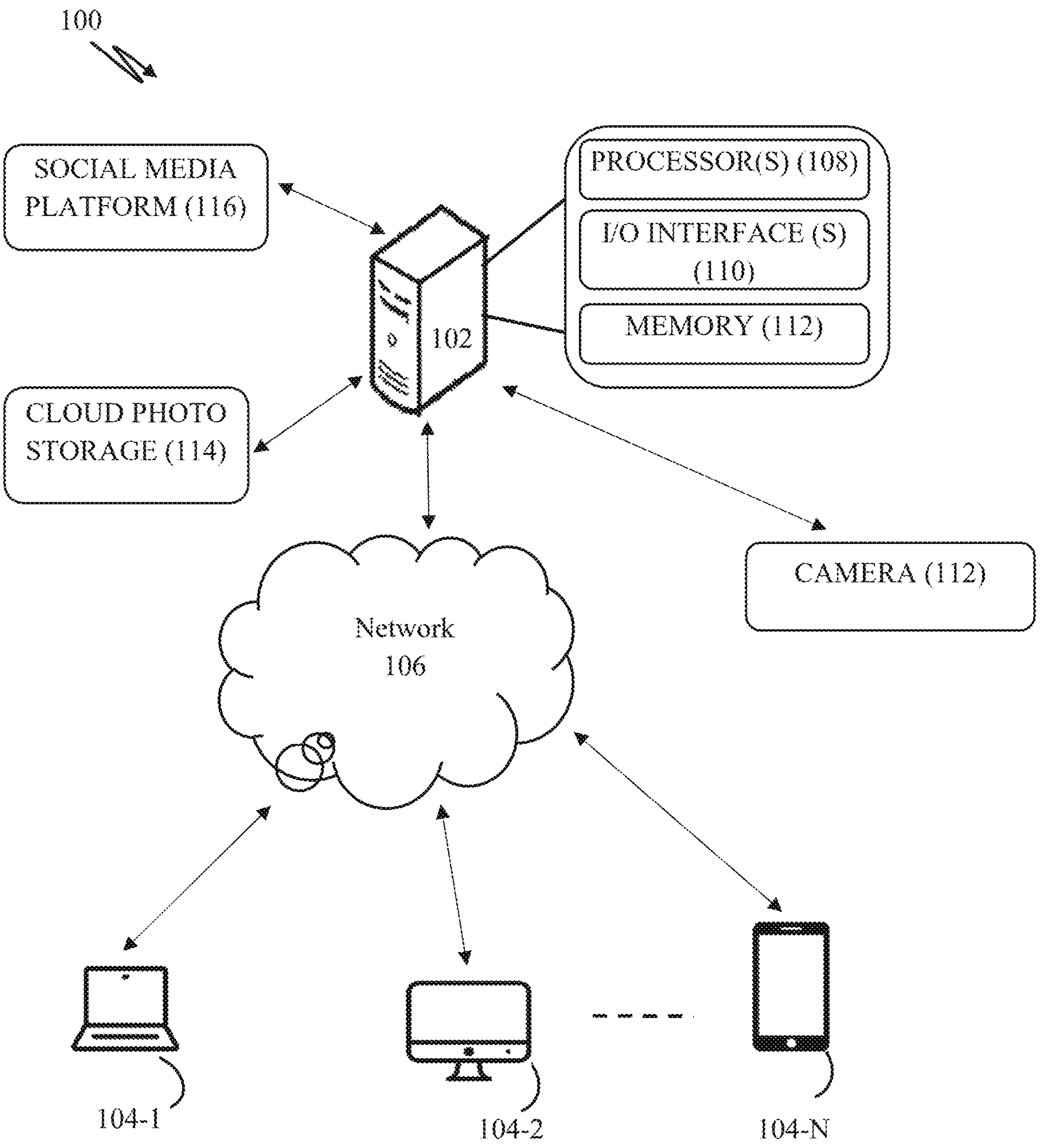
FIG. 1 illustrates a network implementation for an A.I-driven platform for unified campaign management, automating user engagement, transaction processing, and data tracking across digital platforms, in accordance with various embodiments of the present subject matter.

Referring now to FIG. 1, a network implementation 100 of a system 102 for an A.I-driven platform for unified campaign management, automating user engagement, transaction processing, and data tracking across digital platforms is disclosed. The network 100 includes a system 102, one or more user devices 104-N (for example but not limited to one or more user devices 104-1, 104-2 . . . 104-N), and Service Provider(s) 114. In an example, the software may be installed on a user device 104-1. It may be noted that the one or more users may access the system 102 through one or more user devices 104-2, 104-3 . . . 104-N, collectively referred to as user devices 104, hereinafter, or applications residing on the user devices 104.

Although the present disclosure is explained considering that the system 102 is implemented on a server, it may be understood that the system 102 may be implemented in a variety of computing systems, such as a laptop computer, a desktop computer, a notebook, a workstation, a virtual environment, a mainframe computer, a server, a network server, a cloud-based computing environment. It will be understood that the system 102 may be accessed by multiple users through one or more user devices 104-1, 104-3 . . . 104-N. In one implementation, the system 102 may comprise the cloud-based computing environment in which the user may operate individual computing systems configured to execute remotely located applications. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network, or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

In one embodiment, the system 102 may include at least one processor 108, an input/output (I/O) interface 110, a memory 112, and one or more modules explained later in the description. The at least one processor 108 may be implemented as one or more microprocessors, microcomputers, microcontrollers, digital signal processors, Central Processing Units (CPUs), state machines, logic circuitries, and/or any devices that manipulate signals based on operational instructions. Among other capabilities, the at least one processor 108 is configured to fetch and execute computer-readable instructions stored in the memory 112.

The I/O interface 110 may include a variety of software and hardware interfaces, for example, a web interface, a graphical user interface, and the like. The I/O interface 110 may allow the system 102 to interact with the user directly or through the client devices 104. Further, the I/O interface 110 may enable the system 102 to communicate with other computing devices, such as web servers and external data servers (not shown). The I/O interface 110 can facilitate multiple communications within a wide variety of networks and protocol types, including wired networks, for example, LAN, cable, etc., and wireless networks, such as WLAN, cellular, or satellite. The I/O interface 110 may include one or more ports for connecting a number of devices to one another or to another server.

The memory 112 may include any computer-readable medium or computer program product known in the art including, for example, volatile memory, such as static random-access memory (SRAM) and dynamic random-access memory (DRAM), and/or non-volatile memory, such as read only memory (ROM), erasable programmable ROM, flash memories, hard disks, Solid State Disks (SSD), optical disks, and magnetic tapes. The memory 112 may include routines, programs, objects, components, data structures, etc., which perform particular tasks or implement particular abstract data types. The memory 112 may include programs or coded instructions that supplement applications and functions of the system 102. In one embodiment, the memory 112, amongst other things, serves as a repository for storing data processed, received, and generated by one or more of the programs or the coded instructions.

In an embodiment, the system 102 may interact with a camera 112 and/or cloud media storage 114 via network 106. A user using the user device may upload media including, but not limited to; text, videos, infographics, memes, Augmented Reality (AR) content, stories, gifs, audio, livestream, and photos from a home computer or terminal, camera (such as a digital camera, smartphone, e-reader, or other handheld or portable device) to a system 102 via the network 106. A virtual album may be created using media imported from one or more of a user device, camera, and the cloud photo storage.

In an embodiment, the system 102 is in communication with a social media platform 116 via network 106. In an embodiment, the user via user device may link a social network page such as a Facebook user account, from which the user wants to import photos or other digital media content to system 102 for the virtual album. For example, the user may wish to import all his or her media from the Facebook account to feed system, or only some media that the user selects. In addition, the system may enable the user via user device to post campaigns to the social media platform.

As there are various challenges observed in the existing art, the challenges necessitate the need to build the system 102. At first, a user may use the user device 104 to access the system 102 via the I/O interface 110. The user may register the user devices 104 using the I/O interface 110 in order to use the system 102. In one aspect, the user may access the I/O interface 110 of the system 102. The detailed functioning of the system 102 is described below with the help of one or more figures.

In an embodiment, a user may identify one or more media stored on the camera, user device, social media platform(s) (such as Facebook, Instagram, and the like), or cloud media storage to upload to the system 102. Once the media is identified and selected by the user via the user device, they are imported from the social media platform, user device, camera, or cloud media storage to the system 102. The media uploaded to the system may be used to create a virtual album or e-book. In an embodiment, the system may allow the user to create or select the e-book format from a range of options provided by the system, including size, name, format, number of pages, color, background, style, and more.

The following description sets forth exemplary aspects of the present disclosure. It should be recognized, however, that such a description is not intended as a limitation on the scope of the present disclosure. Rather, the description also encompasses combinations and modifications to those exemplary aspects described herein.

In digital advertising and brand marketing, there exists a challenge in generating personalized content for users that aligns with both brand values and causes the user cares about. This challenge stems from the need to process vast amounts of data in real-time, including user preferences, brand identities, and cause-related information, to create meaningful and engaging content. The complexity of this task increases when considering the dynamic nature of user interests and the evolving landscape of social causes. Current solutions for brand-cause marketing often rely on pre-defined campaigns or static matching algorithms. These approaches may involve manual curation of brand-cause partnerships or basic demographic targeting. These methods lack the ability to adapt in real-time to individual user preferences and changing market conditions. Additionally, existing solutions may struggle to maintain consistency across different advertising channels and platforms, potentially diluting the impact of brand-cause initiatives. Existing approaches face several limitations that hinder their effectiveness. First, the lack of real-time personalization may result in missed opportunities to engage users at the most relevant moments. Second, ineffective alignment mechanisms may lead to partnerships that feel inauthentic or fail to resonate with the target audience. Third, current systems often struggle to quantify and demonstrate the impact of brand-cause initiatives, making it difficult for brands to justify investment in these programs. Finally, the inability to process and act on large volumes of data in real-time limits the potential for truly personalized and impactful brand-cause marketing efforts. The system for real-time generation of personalized content utilizes a combination of pre-computed data structures and dynamic processing to efficiently create targeted digital content. At the core of this system is a pre-computed low-latency lookup table that stores associations between brand identifiers and cause records. This lookup table enables rapid retrieval of relevant cause information when a request is received.

In an embodiment, at step 202, the system is configured to receive a request comprising a brand identifier and a user identifier. In an embodiment, upon receiving the request, the system accesses a pre-computed low-latency lookup table to retrieve a plurality of cause records associated with the brand identifier. The use of a pre-computed table allows for fast access to relevant data without the need for complex real-time computations. In an example, the request may originate from a client device or an ad server when an opportunity for content delivery arises. The brand identifier may be a unique alphanumeric code that represents a specific brand or advertiser in the system. For example, a brand identifier may be 'NIKE123' for Nike, or 'COCA456' for Coca-Cola. This identifier allows the system to quickly retrieve relevant brand information and associated content from the lookup table. The user identifier, on the other hand, is a unique code that represents an individual user or their device. This could be a hashed email address, a device ID, or a user account number. For instance, a user identifier may look like "USER789XYZ" or "DEVICE_ID_123ABC". In an embodiment, the user identifier may be a more complex structure, such as a JSON object comprising multiple pieces of information about the user. The system uses the user identifier to access the user's profile, preferences, and interaction history, which are crucial for personalizing the content. By receiving both the brand identifier and user identifier in a single request, the system can efficiently initiate the process of matching the brand with the most relevant cause for that specific user, setting the stage for generating highly personalized content.

In an exemplary embodiment, the system employs a distributed key-value method to efficiently save and retrieve brand and user identifiers from the lookup table. For example, brand identifiers are stored as keys in a 'brands' namespace, with corresponding values containing serialized brand objects. These brand objects encapsulate essential information such as the brand's name, mission statement, campaign budgets, and creative assets. For example, a key-value pair may look like: "brands: NIKE123"→{name: "Nike", mission: "Bring inspiration and innovation to every athlete in the world", budget: 1000000, assets: ["logo.png", "video1.mp4"]. In an exemplary embodiment, user identifiers are similarly stored in a 'users' namespace, with values containing serialized user profile objects. These objects include information such as demographic data, interaction history, and derived preference vectors. A sample key-value pair may be: "users: USER789XYZ"→{age: 28, location: "New York", interests: ["sports", "technology"], engagement History: [{adId: "AD001", timestamp: 1623456789, action: "click"}]}.

In an embodiment, at step 204, the system is configured to retrieve, from the pre-computed low-latency lookup table, a plurality of cause records associated with the brand identifier. Such that each cause record in the low-latency lookup table is associated with a brand-cause compatibility score exceeding a first predetermined threshold. In an example, the lookup table may be implemented as a hash table, where brand identifiers serve as keys, and the corresponding values are collections of cause records. Each cause record within the table may include a unique identifier, a brief description, and a pre-computed compatibility score associated with the respective brand. The brand-cause compatibility scores stored in the lookup table may be calculated using various factors such as brand values, historical campaign data, and cause alignment metrics. For example, brand values may include the core principles, mission, and ethical stance of the brand. Like but not limited to a) sustainability: A brand like Patagonia, known for its environmental advocacy, would have high compatibility scores with causes related to climate change, conservation, and sustainable manufacturing. b) social justice: A company like Ben & Jerry's, which often takes stands on social issues, would have high compatibility scores with causes related to racial equality, and fair labour practices. c) Health and wellness: A brand like Nike would have high compatibility scores with causes related to physical fitness, mental health awareness, and combating childhood obesity.

2. Historical campaign data may include the brand's past cause-related marketing efforts and their outcomes. For example: a) campaign success: If a tech company previously ran a successful campaign supporting STEM education for underprivileged youth, it would have a high compatibility score for similar educational causes. b) engagement metrics: If a food brand's partnership with a hunger relief organization resulted in high user engagement and positive sentiment, it would increase the compatibility score for food security causes. c) long-term partnerships: A beauty brand that has consistently supported breast cancer awareness for several years would have a high compatibility score for health-related causes, particularly those focused on women's health.

3. Cause alignment metrics may include how well a cause aligns with the brand's products, services, target audience, and overall market positioning. For example: a) product relevance: A bottled water company would have high compatibility scores with causes related to clean water access, water conservation, and plastic pollution reduction. b) audience overlap: A brand targeting young parents would have high compatibility scores with causes related to early childhood education, child safety, and family health initiatives. c) geographic focus: A regional bank would have higher compatibility scores with local community development causes in its operating areas compared to global issues. d) industry impact: An electric vehicle manufacturer would have high compatibility scores with causes related to reducing carbon emissions, promoting renewable energy, and developing sustainable transportation infrastructure. c) stakeholder priorities: If a brand's employees or shareholders have expressed strong support for certain causes (e.g., mental health awareness), those causes would receive higher compatibility scores. The brand-cause compatibility scores derived from these factors are then stored in the low-latency lookup table for quick access during the real-time personalization process. For instance: a score of 0.9 may indicate a very strong alignment between the brand and cause. A score of 0.7 may represent a good alignment with room for strengthening the connection. A score of 0.5 may be the minimum threshold for inclusion in the lookup table. These scores are continuously updated based on new campaign data, evolving brand values, and changing cause landscapes. Hence, the use of a pre-computed lookup table allows the system to quickly retrieve relevant cause options for a given brand, enabling real-time personalization without sacrificing performance. Thus, these scores may represent the degree of alignment between a brand and a particular cause, allowing for quick filtering and prioritization during real-time content generation.

The above discussed process is further understood with the help of an example: Let's consider a scenario where the brand identifier 'NIKE123' is received by the system. The process of retrieving cause records associated with this brand identifier from the pre-computed low-latency lookup table would proceed as follows: 1. Lookup Table Structure: The pre-computed low-latency lookup table is implemented as a distributed hash table, optimized for rapid retrieval. It may look something like this (simplified for illustration): "'{"NIKE123": [{"cause_id": "CAUSE001", "name": "Global Sports Education Initiative", "compatibility_score": 0.92}, {"cause_id": "CAUSE045", "name": "Youth Fitness Foundation", "compatibility_score": 0.87}, {"cause_id": "CAUSE112", "name": "Environmental Athletics Association", "compatibility_score": 0.79}, . . . ], . . . }"'2. Retrieval Process: When the system receives the "NIKE123" brand identifier, it performs a hash function on this identifier to locate the correct location in the lookup table where the data is stored. Once the location is identified, the system performs a key-based lookup to retrieve the list of associated cause records. 3. Threshold Application: Let's assume the first predetermined threshold for brand-cause compatibility is set at 0.75. The system will only return cause records with compatibility scores exceeding this threshold. In our example, all three causes listed would be included in the retrieved set. 4. Result: The system would return a list of cause records, each containing the cause identifier, name, and compatibility score: "'[{"cause_id": "CAUSE001", "name": "Global Sports Education Initiative", "compatibility_score": 0.92}, {"cause_id": "CAUSE045", "name": "Youth Fitness Foundation", "compatibility_score": 0.87}, {"cause_id": "CAUSE112", "name": "Environmental Athletics Association", "compatibility_score": 0.79}]'"

In an embodiment, to ensure low-latency access, the lookup table may be distributed across multiple nodes in a cluster, enabling parallel lookups and load balancing. In an embodiment, the system may employ caching mechanisms to store frequently accessed brand-cause pairs in memory, further reducing retrieval times. The pre-computed nature of the lookup table allows for complex compatibility calculations to be performed in advance, reducing the computational load during real-time requests. This approach may enable the system to handle high volumes of incoming requests while maintaining responsiveness. The lookup table may be periodically updated to reflect changes in brand strategies, cause relevance, or market conditions. The system may employ a background process to recalculate compatibility scores and update the table without disrupting ongoing operations. The pre-computed low-latency lookup table may serve as a critical component in enabling rapid retrieval of relevant cause records, facilitating the real-time generation of personalized content that aligns with both brand values and user interests.

The use of a pre-computed low-latency lookup table provides significant technical advantages: 1. Speed: Retrieval time is typically few milliseconds, even for brands associated with hundreds of causes. 2. Scalability: The distributed nature of the table allows it to handle millions of brand-cause associations without performance degradation. 3. Efficiency: By pre-computing compatibility scores and storing only those exceeding the threshold, the system reduces real-time computational load. 4. Consistency: The pre-computed nature ensures consistent results across multiple requests, important for system reliability. This approach allows the system to quickly provide a set of highly compatible causes for any given brand, forming the foundation for subsequent personalization steps. The low-latency lookup table is typically updated daily or weekly to reflect new data and evolving brand-cause relationships, ensuring the system always works with current information while maintaining its real-time performance capabilities Machine Learning Model Architecture and Training: In an embodiment, the system employs a multi-layered machine learning architecture pipeline for computing brand-cause compatibility scores. This model combines several specialized components, each designed to analyse different aspects of the brand-cause relationship. The multi-layered machine learning architecture is a three-layered machine learning architecture. This architecture comprises a Sensory Layer, a Cognitive Layer, and an Executive Layer, each serving distinct functions within the system. In an embodiment, a sensory layer serves as the foundational first layer of the machine learning architecture of the cause-brand alignment. This critical initial stage is responsible for ingesting, processing, and transforming raw input data into meaningful representations that subsequent layers can utilize for higher-level analysis and decision-making. For example, the sensory layer may comprise two main subsystems: the text understanding subsystem and the visual processing subsystem, working in tandem to process and analyzing multi-modal inputs. In an embodiment, the multi-layered machine learning architecture pipeline may include one or more neural network components and/or machine learning components.

The text understanding subsystem utilizes a transformer-based natural language model, which is pre-trained on a vast corpus of for example 100 million web pages related to brands, causes, and corporate social responsibility. This pre-training allows the model to develop a deep understanding of language patterns and contexts relevant to cause-aligned advertising. The transformer-based natural language model is then fine-tuned on a curated dataset of lets' say 1 million brand statements, cause descriptions, and campaign texts, enhancing its ability to extract meaningful features from brand and cause-related text. For example, in an embodiment, this transformer-based natural language model is fine-tuned on a large amount of data like cause marketing content, including annual reports, press releases, social media posts, campaign slogans and taglines, cause descriptions and objectives, and campaign descriptions from successful cause-brand partnerships. For example, the transformer-based natural language model may be trained on text data from Patagonia's environmental campaigns or Nike's social justice initiatives.

For instance, when processing the phrase 'XYZ organization empowers every person to achieve more,' the model understands not just the individual words, but their collective implication of inclusivity and technological enablement. The system generates high-dimensional vector representations (embeddings) for each token, typically 768 or 1024 dimensions, encoding semantic and contextual information. Additional specialized neural network layers are incorporated such that=these layers may include convolutional neural networks (CNNs) for pattern recognition or recurrent neural networks (RNNs) for sequence understanding. The output of this subsystem is a set of feature vectors, each potentially hundreds of dimensions long, that represent the semantic content of the input text, encoding brand values, cause descriptions, and potential alignments.

In an exemplary embodiment, the working of transformer-based natural language model is explained below in detail. The transformer-based natural language model as the core of the text understanding subsystem in the Sensory Layer, processes textual input through a series of operations. Initially, the input text is divided into tokens, which are typically individual words or sub words. For instance, the phrase 'XYZ organization empowers every person' may be tokenized into separate units: ['XYZ', 'organization', 'empowers', 'every', 'person']. This tokenization process allows the model to handle a wide variety of words, including those which hasn't encountered during training. Once tokenized, the text passes through multiple transformer layers. A standard transformer-based natural language model contains 12 such layers, while the larger variant has 24. Each of these layers is composed of two primary components: a self-attention mechanism and a feed-forward neural network. The self-attention mechanism is crucial as it allows the model to weigh the importance of different words in relation to each other within the given context. For example, when processing the word 'empowers' in the sample phrase, the model may assign high attention scores to 'XYZ organization' (the entity doing the empowering) and 'every person' (those being empowered).

Following the self-attention process, each word representation is further refined through a feed-forward neural network. This network helps in processing the attended information and introduces non-linearity, allowing the model to capture more complex relationships between words. As the input passes through these multiple layers, the model builds an increasingly rich contextual understanding of the text. The output of this process is a set of high-dimensional vector representations, or embeddings, for each token in the input text. These embeddings encapsulate not just the general meaning of each word, but also how it's used in the specific context of the sentence. In the above example, the embedding for 'empowers' would encode its general meaning of enabling or giving power, its specific use as an action performed by an organization, its relationship to 'every person' as the recipients of this empowerment, and the broader implication of inclusivity and technological enablement in this corporate context. This representation allows the system to understand complex linguistic constructs and subtle implications, which is crucial for accurately analysing brand communications and cause-related messaging in the context of our cause-brand alignment system. For instance, the vector for 'empowers' may be represented as [0.1, −0.3, 0.5, . . . , 0.2], with 768 or 1024 numbers in total, each encoding specific semantic, syntactic, and contextual information. In an embodiment, Similarly, cause descriptions are processed to generate embeddings. For instance, the embedding for 'education' in EduForAll's mission statement would encode its association with empowerment and accessibility.

In an embodiment, working alongside the text processor, the visual processing subsystem uses a Vision Transformer (ViT) architecture to analyse image inputs. The image inputs may include Brand logos and visual identities, Cause-related imagery and infographics, social media images and videos, Campaign posters and advertisements, Event photographs and promotional materials. In an embodiment, ViT, adapts the transformer model, originally designed for text, to image analysis. This subsystem divides input images into fixed-size patches (e.g., 16×16 pixels) and processes them through a series of transformer layers. The ViT is pre-trained on large datasets of brand imagery and cause-related visuals, such as logos, campaign posters, and social media graphics from various companies and non-profit organizations. For example, the ViT generates embeddings for each image patch, typically resulting in a feature vector of 768 or 1024 dimensions per patch. ViT employs a self-attention mechanism to capture relationships between different parts of the image. For example, when analysing an advertisement, the ViT may identify the relationship between the company logo, product imagery, and human subjects in the image. Specialized layers, trained on brand imagery datasets, enable the system to recognize and interpret brand-specific visual elements, styles, and themes. The output consists of visual feature vectors that encode high-level representations of the input images, capturing brand identity elements, visual consistency, and potential alignment with cause imagery.

In an embodiment, the second layer in the multi-layer architecture is the cognitive layer which comprises three specialized models: the Brand Identity Model, the Cause Analysis Model, and the Audience Response Model. This layer directly ingests and processes the high-dimensional semantic embeddings and visual feature vectors generated by the transformer-based text understanding model and the Vision Transformer (ViT) of the Sensory Layer, establishing a seamless flow of information between the two layers. Each of these models is designed to extract and analyse specific aspects of the brand-cause relationship, enabling a comprehensive understanding of potential alignments. For example, when analysing a brand's identity, the Brand Identity Model examine the brand's mission statement, logo, color scheme, and past marketing campaigns. The model then generates a multidimensional representation of the brand's identity, potentially including factors such as perceived values, target audience demographics, and brand personality traits. The Brand Identity Model, for instance, leverages the 768 or 1024-dimensional embeddings of brand-related text and the corresponding visual feature vectors of brand imagery. It processes these inputs through a custom transformer architecture, allowing it to develop a deep understanding of each brand's unique characteristics. For example, when analysing a brand like XYZ, the model integrates the semantic embeddings of phrases like "XYZ organization empowers every person" with the visual features extracted from XYZ's logo and marketing materials. The model then synthesizes this information with additional brand-specific data, including historical corporate communications, marketing materials, product descriptions, social media engagement metrics, and media coverage. This comprehensive analysis allows the Brand Identity Model to generate a multidimensional representation of the brand's identity, encompassing factors such as perceived values, target audience demographics, and brand personality traits. For example, the model then recognizes XYZ's long-standing commitment to education, evidenced by initiatives like XYZ Imagine Academy and partnerships with educational institutions worldwide. The model identifies XYZ technological expertise across various domains such as cloud computing, artificial intelligence, and productivity software. It also comprehends XYZ's global reach, processing data on the company's presence in over 190 countries and its localization efforts for different markets. For example, the transformer architecture allows the model to attend to relevant information across long sequences of data, capturing complex relationships and long-term dependencies. For example, it may link XYZ's early mission of 'computer in every home' to their current cloud-first strategy, understanding the consistent thread of democratizing technology access.

In an embodiment, working in tandem with the Brand Identity Model, the Cause Analysis Model employs a Graph Neural Network (GNN) to understand the intricate web of relationships between different social causes. The Cause Analysis Model utilizes the semantic and visual embeddings related to various causes, processing them to understand the core objectives, impact areas, and alignment potential of different charitable initiatives. For every cause-node, the model starts with a single feature vector that blends two outputs produced by the Sensory Layer: (i) the text embedding of the cause description taken from the transformer, and (ii) the image embedding of any related logo or graphic taken from the Vision Transformer. The GNN architecture is particularly suited for this task as it can represent and process data in a graph structure, where nodes represent individual causes and edges represent relationships or interactions between causes. For example, the Cause Analysis Model is trained on a diverse dataset including but not limited to: cause's mission statement, historical impact data, current initiatives, academic research on social issues and their interconnections, reports from international organizations (e.g., UN, WHO, World Bank) on global challenges, data from non-profit organizations on various cause areas, government policy documents and social impact assessments, news articles and public discourse on social issues, and the like. In an embodiment, the model may then categorize the cause based on factors such as focus area (e.g., environmental conservation, education, healthcare), geographic scope, and target beneficiaries. For example, when analysing educational initiatives, the model constructs a graph where education is connected to various other nodes such as economic empowerment, digital literacy, and job training. The model understands that improvements in education can lead to better job prospects (connecting to economic empowerment), that modern education increasingly requires digital skills (linking to digital literacy), and that education often needs to align with job market demands (connecting to job training). In an embodiment, the GNN processes this graph structure, allowing it to capture complex, multi-hop relationships between causes. For instance, it may identify that an educational program teaching coding skills not only impacts digital literacy directly but also indirectly affects economic empowerment through improved job prospects in the tech sector.

In an embodiment, the Audience Response Model, one of the critical components of the Cognitive Layer, uses Long Short-Term Memory (LSTM) networks with attention mechanisms to predict how different audiences may react to potential brand-cause partnerships. This model is trained on a rich dataset of historical audience responses, including but not limited to; social media engagement metrics (likes, shares, comments) on cause-related brand posts, consumer surveys and feedback on cause marketing campaigns, sales data correlated with cause-related initiatives, brand sentiment analysis before and after cause partnerships, media coverage and public discourse around brand-cause initiatives. The LSTM architecture allows the model to capture long-term dependencies in audience behaviour, understanding how past experiences and perceptions influence current responses. The attention mechanism enables the model to focus on the most relevant aspects of a potential partnership when making predictions.

For example, for ABC organisation, the Audience Response Model processes historical data showing that the company's audience responds particularly well to initiatives that combine technology with social impact. For example, it may have learned from the positive reception to ABC's AI for good program or its accessibility initiatives for individuals with disabilities. The model may predict audience responses across different segments, understanding that a tech-savvy younger audience may respond differently to a cause partnership compared to enterprise customers or educational institutions. It may also account for regional variations, recognizing that audience responses in for example, North America may differ from those in emerging markets. For example, when predicting audience response to a potential brand-cause partnership, the Audience Response Model may consider factors such as past engagement rates with similar campaigns, demographic overlap between the brand's customers and the cause's supporters, and current social trends. The model may then generate predictions for metrics such as engagement rates, sentiment analysis scores, and potential donation conversion rates.

In the system, these three models work in concert within the Cognitive Layer, each providing crucial insights that contribute to a comprehensive understanding of potential brand-cause alignments. The Brand Identity Model's deep understanding of a company's characteristics, the Cause Analysis Model's grasp of the interconnected nature of social issues, and the Audience Response Model's predictive capabilities for public reception collectively enable sophisticated, recommendations for cause-brand partnerships. In an embodiment, the Cognitive Layer's output serves as input for higher layers in the neural network architecture, providing a rich, multidimensional representation of brand identity, cause relationships, and audience dynamics. This enables subsequent layers to make informed decisions about optimal brand-cause alignments, taking into account the complex interplay of factors that contribute to successful cause marketing initiatives.

In an embodiment, the Executive Layer represents the top layer of the multi layered architecture, serving as the decision-making component that synthesizes information from one or more preceding layers to generate final recommendations for brand-cause alignments. The Executive Layer may incorporate two primary models: the Alignment Scoring Model and the Impact Prediction Model. These models may work in concert to evaluate potential partnerships and optimize campaign strategies. The Alignment Scoring Model may integrate data and insights from the cognitive layer to compute compatibility scores between brands and causes The Alignment Scoring Model is a Siamese Neural component with twin encoders—one for the brand embedding and one for the cause embedding—whose distance output becomes the compatibility score. The Alignment Scoring Model uses four feature groups drawn from the Cognitive Layer: brand—cause similarity metrics, historical success patterns, identified risk factors, and current market context. For example, when evaluating a potential partnership between a brand and a cause, the Alignment Scoring Model may analyse the brand's identity characteristics from the Brand Identity Model, the cause's focus areas from the Cause Analysis Model, and predicted audience responses from the Audience Response Model. The model may then generate a composite alignment score that represents the overall compatibility and potential effectiveness of the partnership.

The Impact Prediction Model may build upon the outputs of the Alignment Scoring Model to forecast the potential social impact and effectiveness of proposed partnerships or campaigns. In an embodiment, The Impact Prediction Model is an ensemble of gradient-boosted decision-tree models (e.g., XGBoost, LightGBM) trained to forecast campaign results. It takes the alignment score and for example extra input: historical campaign performance, market conditions, planned resource allocation, and timing factors such as seasonality. The model may analyze historical data from similar campaigns, taking into account factors like donation conversion rates, engagement metrics, and long-term impact indicators. The Executive Layer may use the outputs from both the Alignment Scoring Model and the Impact Prediction Model to make data-driven decisions and recommendations. For instance, the layer may rank potential brand-cause partnerships based on their alignment scores and predicted impact, allowing users to prioritize the most promising opportunities. In an embodiment, the Executive Layer may also incorporate a feedback loop mechanism. This mechanism may allow the system to compare predicted outcomes with actual results from implemented campaigns. The feedback data may be used to continuously refine and improve the accuracy of both the Alignment Scoring Model and the Impact Prediction Model.

Example Calculation: Let's say we have a tech company "TechInnovate" and an education-focused charity "EduForAll". 1. Alignment Scoring Model: Brand Identity (from Brand Identity Model): Technology-focused, innovation-driven (Score: 0.8). Cause Focus (from Cause Analysis Model): Education, digital literacy (Score: 0.9). Audience Overlap (from Audience Response Model): 75% overlap (Score: 0.75). Historical Performance: Previous tech-education partnerships averaged 0.7 success rate (Score: 0.7). The Alignment Scoring Model may use a weighted average: Alignment Score=(0.3 0.8)+ (0.3 0.9)+ (0.2 0.75)+ (0.2 0.7)=0.805. 2. Impact Prediction Model: This model may consider: Alignment Score: 0.805, Proposed Budget: $100, 000, Campaign Duration: 3 months, Platform: Social media focus. Based on historical data and machine learning predictions, the Impact Prediction Model may forecast: Estimated Donations: $150,000, Engagement Rate: 15%, Long-term Impact Score: 0.75. The Impact Prediction Model may combine these into a single Impact Score: Impact Score=(0.4 (150000/100000))+ (0.3 0.15)+(0.3 0.75)=0.855. 3. Final Executive Layer Score: The Executive Layer may combine the Alignment Score and Impact Score: Final Score=(0.5 0.805)+ (0.5 0.855)=0.83. This final score of 0.83 represents the overall compatibility and predicted effectiveness of the partnership between TechInnovate and EduForAll.

Lookup Table Storage: Assuming the first predetermined threshold for storing brand-cause pairs in the lookup table is 0.75, this partnership would be included in the table. The lookup table may look something like this:

| Brand ID | Cause ID | Compatibility Score |
|---|---|---|
| TechInnovate | EduForAll | 0.83 |
| EcoFriendly | GreenEarth | 0.79 |
| HealthCorp | FitForLife | 0.77 |
| LocalBank | CommunityFirst | 0.76 |

This pre-computed lookup table may store all brand-cause pairs that exceed the predetermined threshold of 0.75. The table is designed for low-latency retrieval, allowing the system to quickly access compatible brand-cause pairs without the need for real-time complex calculations during ad serving.

In an embodiment, the machine learning model includes a continuous learning phase. In the continuous learning phase, implemented by a continuous learning module, the system is deployed in real-world applications but continues to learn and improve. This phase involves: 1. implementing a feedback loop that captures outcomes of recommended brand-cause partnerships 2. developing mechanisms to update model weights based on new data without compromising existing knowledge (addressing the "catastrophic forgetting" problem in neural networks) 3. creating an anomaly detection system to identify unexpected outcomes that require deeper analysis. For example, if the system recommends a partnership between a tech company and an educational initiative, and this partnership significantly outperforms expectations, the system analyzes various factors that contributed to this success. The system may identify that the combination of the company's AI expertise with the cause focus on underprivileged students created unexpected synergies. Conversely, if a recommended partnership underperforms, the system conducts a thorough analysis to understand why. It may discover that while the brand and cause seemed compatible, the timing of the campaign coincided with negative publicity in an unrelated area of the company's operations, impacting the partnership's reception. The system uses these insights to refine its understanding and improve future recommendations. This may involve: 1. Adjusting the weights in the Alignment Scoring Model to place more emphasis on factors that have shown to be critical in recent successful partnerships 2. Updating the Cause Analysis Model to better account for emerging social issues or changing public perceptions of existing causes. 3. Fine-tuning the Audience Response Model to more accurately predict reactions in specific market segments or geographical regions. Through this continuous learning process, the system becomes increasingly sophisticated in its understanding of brand-cause relationships. It develops the ability to identify subtle factors that contribute to successful partnerships and to anticipate potential challenges that may not be immediately obvious. This multi-phase development approach, culminating in continuous learning, ensures that the cause-brand alignment system remains at the cutting edge of marketing technology, constantly evolving to meet the changing landscape of corporate social responsibility and cause marketing.

In the continuous learning phase, the system may update the audience response model based on tracked user interactions. For example, if the system observes that users in a certain demographic are consistently engaging more with environmental causes than initially predicted, it adjusts the weights in the LSTM network of the audience response model. This adjustment might involve increasing the importance of environmental-related features for that demographic in future predictions. In an embodiment, the system may also refine the alignment score computation based on actual campaign outcomes. For instance, if a brand-cause partnership that received a high alignment score underperforms in terms of user engagement, the system analyses the discrepancy. It may discover that while the brand and cause values aligned well, the campaign timing coincided with a competing major event. The system then adjusts its alignment scoring algorithm to incorporate external event data as a factor in future calculations. In an embodiment, Furthermore, in the continuous learning phase, the system may update user determination criteria based on engagement patterns observed across campaigns. For example, if the system notices that users who engage with multiple causes (rather than focusing on a single cause) tend to have higher long-term engagement rates, it adjusts its user selection algorithm. The system might start prioritizing these 'multi-cause' users for future campaigns, potentially leading to improved overall engagement rates. The system may also implement anomaly detection algorithms to identify unexpected outcomes that require deeper analysis. For instance, if a campaign suddenly receives an unusually high engagement rate, the system flags this for investigation. It might discover a viral social media trend that amplified the campaign's reach, leading to the development of new features that can detect and leverage similar trends in the future. Through this continuous learning process, the system becomes increasingly sophisticated in its understanding of brand-cause dynamics, user behaviour, and engagement patterns. This adaptive approach ensures that the system remains effective and relevant in the face of changing social media landscapes and evolving user preferences.

In an embodiment, the machine learning model is continuously improved through an adaptive training process that leverages filtered, high-quality data sets derived from real-time user interactions. This approach ensures that the model remains current and effective while optimizing computational resources. The continuous training process operates through a data filtering and model updating mechanism. For instance, consider a scenario where the system has served 1 million personalized cause-aligned advertisements over the past 24 hours. The data quality module first filters this vast dataset to identify high-value training samples. It might select interactions where users spent more than 10 seconds viewing the ad, clicked on the interactive donation button, or shared the ad on social media. This filtering process could reduce the dataset to 100,000 high-quality samples. The system then applies additional filtering criteria. For example, it might prioritize data from the past 6 hours to capture the most recent trends, further reducing the dataset to 25,000 samples. To ensure diversity and prevent overfitting, the system might cap the number of samples from any single brand-cause combination to 1,000, potentially bringing the final filtered dataset to 20,000 samples. This filtered dataset is then used to update the machine learning model. For example, if the model is a neural network, it employs incremental learning techniques to adjust its weights based on these 20,000 samples. Instead of a full retraining, which could take hours, this incremental update might be completed in minutes, allowing the model to adapt quickly to emerging trends. The training process utilizes an adaptive learning rate mechanism. For instance, if the filtered data shows a sudden surge in engagement with environmental causes, possibly due to a major climate event, the learning rate for parameters related to environmental cause matching might temporarily increase from 0.01 to 0.05. This allows the model to quickly adapt to this shift in user behaviour. To prevent overfitting, especially when dealing with potentially sparse data in some brand-cause combinations, the training process incorporates regularization techniques.

In an embodiment, at step 206, the system is configured to compute, using the machine learning model, a plurality of cause-user relevance scores. Such that each cause-user relevance score represents a relevance between the user identifier and a respective cause record. These cause records are the ones which are saved in the lookup table across the brand identifier received above. In an embodiment, the system employs a machine learning model to compute the user-cause relevance scores. This model takes into account various user-specific factors and cause characteristics to determine how likely a user is to engage with and support a particular cause. 1. Data Inputs: a) User Data: This includes demographic information, browsing history, past interactions with cause-related content, social media activity, and any explicitly stated preferences or interests. b) Cause Data: This uses the same cause records stored in the brand-cause lookup table, including cause descriptions, focus areas, and historical performance metrics. 2. Feature Extraction: The system extracts relevant features from both user and cause data. For example: User features may include age, location, income bracket, interests, and past donation history. Cause features may include focus area (e.g., environment, education, health), geographic scope, and target beneficiaries. 3. Machine Learning Model: The system uses a gradient boosting model, such as XGBoost or LightGBM, to compute the user-cause relevance scores. This model is trained on historical data of user interactions with various causes. In an embodiment, the system employs the three-layered ML model as discussed above to calculate the cause-user relevance scores. 4. Scoring Process: For each cause in the brand-cause lookup table associated with the current brand, the model computes a relevance score for the current user.

In an embodiment, the system, at step 208, is configured to select a target cause record from the plurality of cause records. The target cause record has a highest cause-user relevance score among the plurality of cause-user relevance scores. The highest cause-user relevance score exceeds a second predetermined threshold. For our example with a user named Alice and the brand identifier AthleteFirst, the system computes the following cause-user relevance scores: 1. Global Youth Sports Initiative (GYSI001): Cause-User Relevance Score: 0.85. 2. Healthy Education for All (HEDU045): Cause-User Relevance Score: 0.62. 3. Environmental Athletics Association (ENVI112): Cause-User Relevance Score: 0.78. Let's assume the second predetermined threshold for cause-user relevance is 0.70. In this case, the system identifies that the Global Youth Sports Initiative (GYSI001) has the highest cause-user relevance score (0.85) among the plurality of cause-user relevance scores, and this score exceeds the second predetermined threshold of 0.70. Therefore, the system selects the Global Youth Sports Initiative (GYSI001) as the target cause record for this particular user-brand interaction. This selection ensures that the chosen cause is highly relevant to the user, Alice, based on her interests and characteristics. The cause-user relevance score calculation occurs in real-time when an ad request is received. This process ensures that the most up-to-date user information is considered when selecting the most relevant cause for the current interaction.

The second predetermined threshold serves as a quality control measure, ensuring that only causes with a sufficiently high relevance to the user are considered for the final selection. This threshold is crucial in maintaining the effectiveness and user engagement of the cause-aligned advertisements. In one embodiment, the second predetermined threshold is set at 0.70 on a scale from 0 to 1. This value is determined based on extensive A/B testing and historical performance data, which showed that causes with relevance scores above 0.70 tend to result in significantly higher user engagement and conversion rates. However, the system is designed with flexibility in mind. In another embodiment, the second predetermined threshold is dynamically adjusted based on various factors, including: a) Time of day: The threshold might be lowered during off-peak hours to ensure ad delivery. b) User engagement history: For users with historically high engagement rates, the threshold might be raised to ensure only the most relevant causes are presented. c) Campaign objectives: Depending on the brand's specific campaign goals, the threshold might be adjusted to prioritize reach or precision. The system also incorporates a feedback loop that continuously monitors the performance of selected causes. If the engagement rates for causes near the threshold consistently underperform, the system may automatically adjust the threshold to optimize overall campaign performance. In yet another embodiment, the second predetermined threshold is customizable by the brand. This allows brands to have fine-grained control over the relevance level of causes associated with their advertisements. For instance, a brand focusing on highly targeted campaigns might set a higher threshold of 0.80, while a brand aiming for broader reach might set it at 0.65.

At step 210, with the brand identifier (AthleteFirst), user profile (Alice), and target cause record (Global Youth Sports Initiative) determined, the system proceeds to generate, transmit, and render personalized content in real-time. This process combines brand-related content associated with the brand identifier and cause-related content associated with the target cause record, tailored specifically for the identified user. For example, the personalised digital content may be a personalised advertisement for the user. Stage 1: Advertisement Generation a) Ad Format Selection: The system selects an HTML5 interactive ad format, optimized for mobile devices, based on Alice's browsing habits. b) Content Retrieval: The system retrieves: AthleteFirst's logo, 'Empower Your Performance' tagline, and latest running shoe images from the brand asset database. Global Youth Sports Initiative's logo, mission statement, and impact statistics from the cause content repository. Real-time data on local running events in Alice's area for added contextual relevance. c) Ad Assembly: Using a pre-designed template for cause-aligned ads, the system: Positions AthleteFirst's logo prominently at the top. Places the running shoe image centrally with the "Empower Your Performance" tagline. Integrates the Global Youth Sports Initiative logo in the lower third. Adds a dynamically generated call-to-action button. d) Personalization: The system employs natural language generation to create the ad copy: "Alice, your run can change a life. Every purchase helps bring sports to youth worldwide." It also includes personalized impact metrics: "10,000 young athletes supported in 2023". c) Quality Assurance: Automated checks ensure brand safety and content appropriateness.

Stage 2: Transmission a) Device Identification: The system identifies Alice's smartphone as the target device. b) Device Capability Assessment: It assesses the device's screen size, resolution, operating system, and available bandwidth. c) Ad Optimization: The ad is optimized for Alice's specific device: Visual elements are resized for her smartphone's screen. Interactive elements are adjusted for touch input. Video quality is set based on her current network conditions. d) Transmission Protocol Selection: The system selects HTTP/2 for efficient web-based ad delivery. c) Caching and Fallback: Key ad components are cached on Alice's device for faster loading in future interactions.

Stage 3: Rendering a) Ad Delivery: The optimized, personalized advertisement is transmitted to Alice's smartphone. b) Rendering Verification: The system confirms successful ad rendering on Alice's device. c) User Interaction Tracking: Client-side scripts are embedded to capture real-time engagement data as Alice interacts with the ad. d) Donation Processing: A secure payment gateway is set up to process donations if Alice interacts with the charitable engagement button. c) Performance Analysis: The system begins collecting metrics on Alice's interaction with the ad, including viewing time and any clicks or donations made. Final Assembly and Delivery: The system compiles all these elements into a single, cohesive ad unit, optimized for quick loading and smooth interaction on Alice's device. This personalized content is now ready for transmission and rendering, creating a unique, relevant experience that connects AthleteFirst's brand, the Global Youth Sports Initiative cause, and Alice's personal interests in a compelling, real-time generated advertisement.

In an embodiment, the personalized advertisement incorporates a key feature: the interactive AdsUp button. This innovative element seamlessly blends brand promotion with charitable giving, embodying the core concept of converting user engagement into real-time, brand-funded donations. a) Button Design and Functionality: The AdsUp button is prominently placed within the ad unit, designed with AthleteFirst's brand color. It features an engaging label: "Empower Youth with Your Click". When Alice interacts with the button, it triggers a microdonation from AthleteFirst to the Global Youth Sports Initiative, without requiring Alice to make a purchase or donate her own money. b) Interaction Variations: The AdsUp button can take various forms to suit different ad formats and user preferences: A clickable button in standard display ads. A swipe able slider in more interactive formats, allowing users to visualize increasing donation amounts. An interactive video element that triggers a donation upon completion of viewing, ideal for video ad formats. A tap-to-donate feature integrated with mobile payment systems for seamless mobile interactions. c) Real-time Feedback and Impact Visualization: Upon clicking, Alice receives immediate visual feedback. An animation shows a running shoe leaving a trail that transforms into sports equipment for youth. A dynamic impact counter displays real-time updates of total donations made or young athletes supported. Each interaction may increase the donation amount or unlock new cause information, gamifying the experience. d) Educational Layer: Tapping the button reveals a brief, informative overlay about the Global Youth Sports Initiative's work, educating Alice while maintaining engagement.

Real-time Financial Transaction Processing: The system includes a sophisticated real-time financial transaction processing module that executes the donation triggered by the AdsUp button activation: a) Immediate Process Initiation: Upon Alice's interaction with the AdsUp button, the system instantly initiates the donation process. b) Secure Payment Handling: The module securely retrieves pre-authorized payment information associated with AthleteFirst's campaign fund from an encrypted database. c) Real-time Transaction Execution: It processes the financial transaction in real-time, transferring the specified donation amount from AthleteFirst's fund to the Global Youth Sports Initiative's account. d) Confirmation and Receipt Generation: The system generates a transaction receipt and sends confirmation to both AthleteFirst and the Global Youth Sports Initiative. Alice receives a pop-up notification: "Thank you! Your click has just helped provide sports equipment to underprivileged youth. AthleteFirst has donated $1 on your behalf." c) Data Recording and Impact Tracking: The donation amount and transaction details are recorded in the system's database for tracking and reporting purposes. Campaign impact metrics are updated in real-time, reflecting the latest donation.

Example Scenario: Let's consider Alice's interaction with the AthleteFirst ad supporting the Global Youth Sports Initiative: 1. Alice views a 15-second video showcasing AthleteFirst's latest running shoe and its potential impact on performance. 2. At the end of the video, the AdsUp button appears with the text "Click to Empower Youth Athletes". 3. The button includes information stating that for each click, AthleteFirst will donate $1 to the Global Youth Sports Initiative to provide sports equipment to underprivileged youth. 4. Inspired by the cause and the simplicity of the action, Alice clicks the button. 5. Upon Alice's click, the following processes occur in real-time: a) The system immediately registers the interaction and initiates the donation process. b) It securely retrieves AthleteFirst's pre-authorized payment information from the system's encrypted database. c) The financial transaction processing module executes a $1 transfer from AthleteFirst's designated campaign fund to the Global Youth Sports Initiative's account. d) Within seconds, Alice receives a pop-up notification: "Thank you! Your click has just helped provide sports equipment to underprivileged youth. AthleteFirst has donated $1 on your behalf." c) Simultaneously, the system sends a transaction confirmation to both AthleteFirst and the Global Youth Sports Initiative. f) The donation is recorded in the system's database, updating the campaign's total impact metrics. g) An animation plays, showing a running shoe transforming into various sports equipment, visually representing the impact of Alice's engagement. h) The impact counter on the ad updates, showing the total number of youth athletes supported through the campaign so far.

In an embodiment, at step 214, the system includes a user engagement tracking module configured to monitor, record, and analyze user interactions with the personalized advertisement. User interactions refer to any measurable engagement a user has with the advertisement, including but not limited to: a) Viewing the advertisement (impression) b) Clicking on the advertisement c) Watching a video advertisement to completion d) Sharing the advertisement on social media platforms e) Commenting on or reacting to the advertisement f) Following a link within the advertisement to learn more about the cause g) Making a donation through the advertisement h) Signing up for a newsletter or further information i) Participating in a survey or poll within the advertisement. For example, a user may view a personalized video advertisement about a tech company's partnership with a digital literacy cause, watch it to completion, share it on their social media profile, and then click through to make a small donation, for example using the Adsup buton. The user engagement tracking module assigns a monetary value to each type of interaction, which is then used to calculate the total value of user engagement for each advertisement. This monetary value is not a direct financial transaction, but rather a representation of the engagement's worth to the brand and cause.

In an embodiment, the system incorporates a customer loyalty score, ranging from 0 to 1, to weigh the monetary value of each interaction. This loyalty score is based on factors such as: Frequency of interactions with the brand or cause, History of donations or purchases, Length of relationship with the brand or cause, Engagement levels across multiple campaigns. The monetary value assignment follows this general principle: 1. If the customer's loyalty score is closer to 1 (high loyalty), the weightage and thus the monetary value assigned to their interactions is higher. 2. If the customer's loyalty score is closer to 0.5 (moderate loyalty), the weightage and monetary value assigned is lower. For example, the system calculates the weighted monetary value of an interaction using the following formula: Weighted Monetary Value=Base Interaction Value (0.5+Loyalty Score) Where: Base Interaction Value is a predetermined value for each type of interaction. Loyalty Score is the customer's loyalty score (0 to 1) For instance: 1. A high-loyalty customer (score 0.9) clicks on an ad: Base click value: $0.50; Weighted value=$0.50 (0.5+0.9)=$0.70. 2. A moderate-loyalty customer (score 0.6) clicks on the same ad: Base click value: $0.50; Weighted value=$0.50 (0.5+0.6)=$0.55. The user engagement tracking module continuously updates these values and stores them in a database. This data is then used to: a) Measure the effectiveness of each personalized advertisement. b) Calculate the return on investment (ROI) for cause-aligned marketing campaigns. c) Refine the machine learning model's understanding of successful brand-cause-user alignments. d) Provide insights into brands and causes about user engagement patterns. The system also implements a dynamic interaction value adjustment mechanism. This mechanism periodically reassesses and adjusts the base interaction values based on a) Overall campaign performance b) Specific cause-related goals c) Market trends in cause-aligned advertising. For example, if a campaign's goal is to raise awareness about a specific cause, the system might temporarily increase the base value for ‘sharing’ interactions to encourage more social media spread.

Microdonation Feature Integration: In an embodiment, in addition to the AdsUp button, the system incorporates a sophisticated microdonation feature, enabling users like Alice to make small, frequent donations as part of their interaction with cause-aligned advertisements. This feature is designed to lower the barrier to entry for charitable giving and increase overall engagement with cause-aligned marketing campaigns. Key aspects of the microdonation system include a) Donation Thresholds: The system allows for extremely small donation amounts, as low as $0.01, making it accessible for users of all financial backgrounds. b) Aggregation: To manage transaction costs efficiently, the system aggregates microdonations until they reach a predetermined threshold before processing the transaction. c) User Wallets: The system maintains a virtual wallet for each user, where microdonations accumulate until the transaction threshold is reached. d) Brand Matching: Brands like AthleteFirst can opt to match user microdonations, effectively doubling the impact of each small contribution. Enhanced Example Scenario: Let's expand on Alice's interaction with the AthleteFirst ad supporting the Global Youth Sports Initiative: 1. The ad now includes an interactive element: a virtual run tracker integrated with Alice's fitness app. 2. For every mile Alice runs, she can opt to donate $0.10 to the Global Youth Sports Initiative, matched by AthleteFirst. 3. Over the course of a month, Alice runs 50 miles, resulting in 50 microdonations of $0.10 each. 4. The system aggregates these microdonations in Alice's virtual wallet, totaling $5.00. 5. Once the predetermined threshold of $5.00 is reached, the system processes the transaction: a) $5.00 is transferred from Alice's linked payment method to the Global Youth Sports Initiative. b) AthleteFirst matches the donation, transferring an additional $5.00 to the Initiative. c) Alice receives a notification: "Your runs have raised $10 for the Global Youth Sports Initiative! Alice receives a notification: "Your runs have raised $10 for the Global Youth Sports Initiative! $5 from you and $5 matched by AthleteFirst. You've helped provide sports equipment for 2 underprivileged youth!" d) The system resets Alice's microdonation wallet to $0.00. The entire process occurs seamlessly in the background, with Alice's runs automatically triggering microdonations without requiring constant interaction.

In an embodiment, at step 216, the system implements a continuous learning module that refines the machine learning model based on real-time user engagement data. This module is designed to dynamically update cause-user relevance scores and brand-cause compatibility scores, ensuring that the model remains current and increasingly accurate over time. The continuous learning module operates as follows: a) Data Ingestion: The module continuously ingests user engagement data from the user engagement tracking module. This data includes but is not limited to: Interaction types (clicks, views, shares, donations, etc.), Weighted monetary values of interactions, User loyalty scores, Temporal data (time of interaction, duration of engagement), Contextual data (device type, location, etc.). b) Data Preprocessing: The ingested data is preprocessed to ensure compatibility with the machine learning model. This involves: Normalization of numerical data, Encoding of categorical variables, Handling of missing values, Feature extraction and selection. c) Incremental Learning: The system employs an incremental learning approach, allowing the model to update its parameters without requiring a full retraining on the entire dataset. This is achieved through: Online learning algorithms (e.g., Stochastic Gradient Descent), Mini-batch processing of new data, Adaptive learning rates to balance stability and plasticity. d) Feedback Loop: The system creates a feedback loop where the outcomes of each advertisement (in terms of user engagement) inform the refinement of cause-user relevance scores and brand-cause compatibility scores. c) Performance Monitoring: The module continuously monitors the model's performance using metrics such as: Prediction accuracy, Mean squared error, Area under the ROC curve, F1 score. f) Automated Retraining Triggers: The system includes automated triggers for more comprehensive model retraining, based on: Significant drops in performance metrics, Detection of concept drift, Accumulation of a certain volume of new data. The continuous learning process refines two key components: 1. Cause-User Relevance Scores: The model updates its understanding of which causes resonate with which user segments based on engagement patterns. It adjusts the weights of various features that contribute to cause-user relevance. 2. Brand-Cause Compatibility Scores: The model refines its assessment of how different brands align with various causes. It updates the importance of different factors in determining brand-cause compatibility.

Example of Continuous Learning Process: Let's consider a tech company "Innovate Tech" partnering with a digital literacy cause "CodeForAll". Initial State: Cause-User Relevance Score for user segment A (young urban professionals) and CodeForAll: 0.7. Brand-Cause Compatibility Score for InnovateTech and CodeForAll: 0.8. After running a campaign for one week: 1. The system observes that user segment A has higher than expected engagement with the CodeForAll advertisements: Click-through rate is 25% above average, share rate is 40% above average, Donation rate is 15% above average. 2. The continuous learning module processes this data: It increases the weight of features associated with digital literacy causes for user segment A. It adjusts the cause-user relevance score for this segment and CodeForAll upward. 3. Simultaneously, the system notices that the brand-cause partnership is performing well: Overall engagement rates are 30% higher than the average for InnovateTech's previous campaigns. User sentiment analysis of comments and shares shows overwhelmingly positive reception. 4. The module updates its parameters: It increases the compatibility score between tech companies and digital literacy causes. It adjusts the weights of factors contributing to brand-cause compatibility, giving more importance to mission alignment and less to historical partnership data. 5. After processing this new data, the system updates its scores: New Cause-User Relevance Score for user segment A and CodeForAll: 0.85 (up from 0.7). New Brand-Cause Compatibility Score for InnovateTech and CodeForAll: 0.9 (up from 0.8). The continuous learning module also implements a long-term trend analysis component. This component: a) Identifies emerging patterns in cause preferences across different user segments. b) Detects shifts in brand-cause alignment effectiveness over time. c) Adjusts the model's long-term memory to account for these trends. In an embodiment, the lookup table is periodically updated through a process that integrates the continuous improvement of the machine learning model. This update mechanism ensures that the pre-computed compatibility scores remain relevant and reflect the latest insights derived from user interactions and market dynamics. For example, consider an update cycle after a predetermined time, the following process may be initiated: 1. The machine learning model undergoes a retraining using the accumulated data from a predetermined time. Like this retraining may involve processing 500,000 high-quality user interactions, allowing the model to capture recent trends and shifts in user behaviour. 2. Once the retraining is complete, the system uses this updated model to recompute the compatibility scores for all brand-cause pairs in the database. For instance, if there are 1,000 brands and 5,000 causes in the system, this process may involve calculating up to 5 million compatibility scores. 3. As new scores are computed, they are compared against the existing scores in the lookup table. Only scores that have changed beyond a certain threshold (e.g., a change of 0.05 or more) are updated in the table to minimize unnecessary updates. 4. The system also identifies new brand-cause pairs that now meet the threshold for inclusion in the lookup table (e.g., scores above 0.75) and adds them to the table. Similarly, pairs whose scores have dropped below the threshold are removed. 6. Throughout this process, the system maintains a secondary, read-only copy of the lookup table to serve ongoing ad requests, ensuring uninterrupted operation. Once the update process is complete, the system seamlessly switches to the new, updated table. This integrated approach ensures that the lookup table always reflects the latest insights from the continuously improving machine learning model.

Figure 2A:
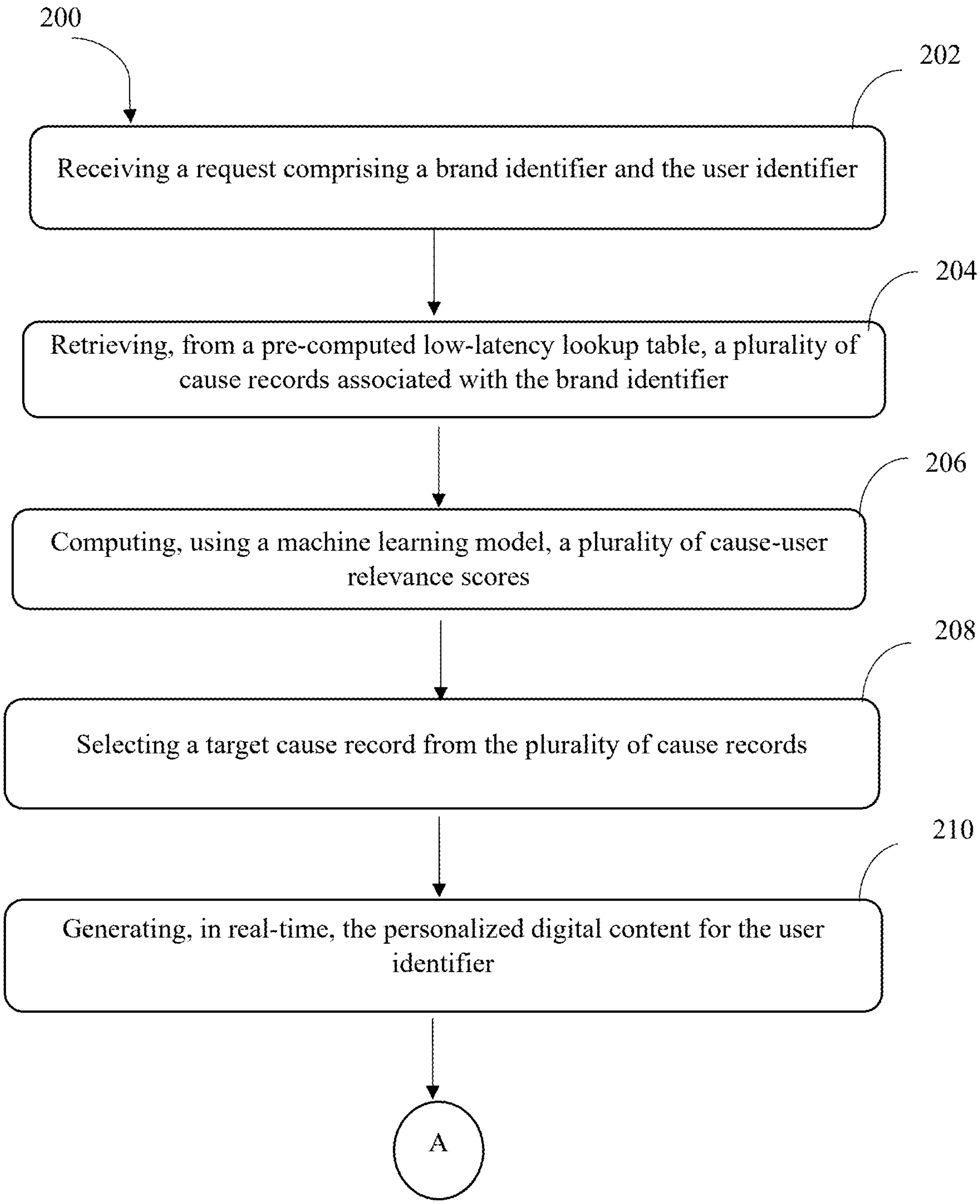
FIGS. 2A and 2B illustrate a method, in accordance with various embodiments of the present subject matter.
Figure 2B:
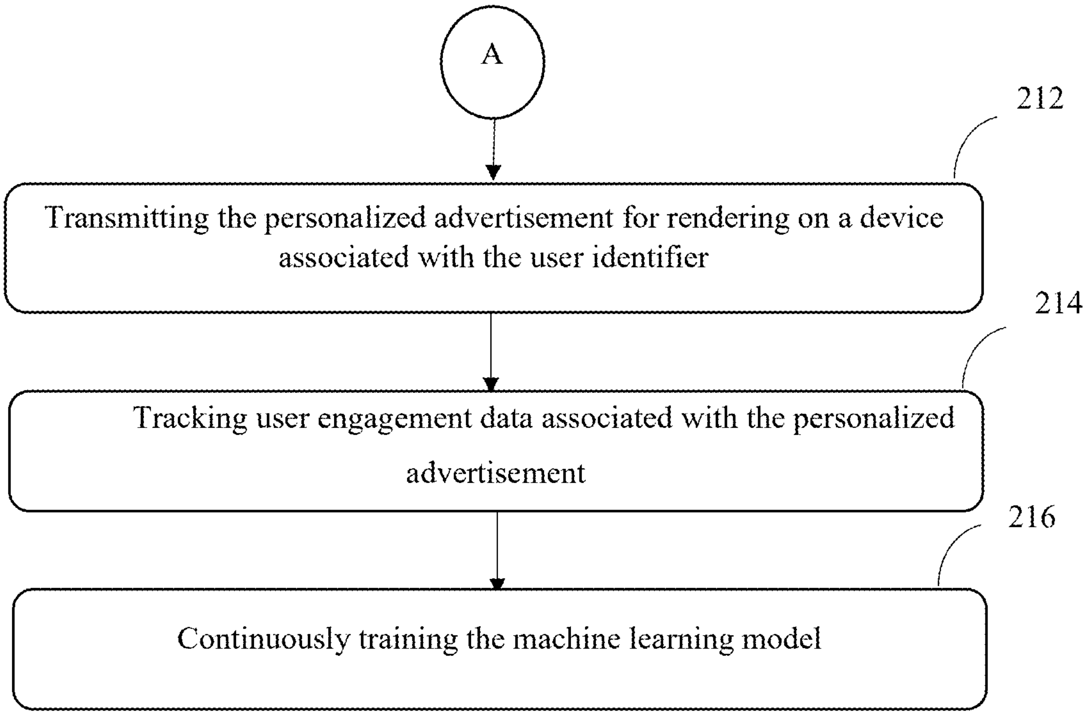

Referring now to FIG. 2, a method 200 for real-time generation of personalized content for a user associated with a user identifier is illustrated. The method 200 may be described in the general context of computer executable instructions. Generally, computer executable instructions can include routines, programs, objects, components, data structures, procedures, modules, functions, etc., that perform particular functions or implement particular abstract data types. The order in which method 200 is described is not intended to be construed as a limitation, and any number of the described method blocks can be combined in any order to implement the method 200 or alternate methods for real-time generation of personalized content. Additionally, individual blocks may be deleted from method 200 without departing from the scope of the subject matter described herein. Furthermore, the method 200 can be implemented with any suitable hardware, software, firmware, or combination thereof. However, for case of explanation, in the embodiments described below, method 200 may be considered to be implemented in the above-described system 102.

At block 202, the system receives a request comprising a brand identifier and the user identifier. This request may be triggered by various events, such as a user visiting a webpage, opening an app, or interacting with a digital platform associated with the brand.

At block 204, the system retrieves, from a pre-computed low-latency lookup table, a plurality of cause records associated with the brand identifier. Each cause record in the low-latency lookup table is associated with a brand-cause compatibility score exceeding a first predetermined threshold.

At block 206, the system computes, using a machine learning model, a plurality of cause-user relevance scores. Each cause-user relevance score represents a relevance between the user identifier and a respective cause record from the retrieved plurality of cause records. This computation takes into account various factors such as user demographics, past behavior, and expresses interests to determine the most relevant causes for the specific user.

At block 208, the system selects a target cause record from the plurality of cause records. The target cause record has the highest cause-user relevance score among the plurality of cause-user relevance scores, and this highest score exceeds a second predetermined threshold. This ensures that only highly relevant causes are considered for the personalized content.

At block 210, the system generates, in real-time, a personalized advertisement by combining brand-related content associated with the brand identifier and cause-related content associated with the target cause record. This step involves dynamically assembling various content elements to create a unique, personalized advertisement that aligns both brand and cause.

At block 212, the system transmits the personalized advertisement for rendering on a device associated with the user identifier. This may be a mobile device, desktop computer, smart TV, or any other internet-connected device capable of displaying the advertisement.

At block 214, the system tracks user engagement data associated with personalized advertisements. This tracking may include metrics such as view time, click-through rate, interaction with specific elements of the advertisement, social shares, and any resulting conversions or donations.

At block 216, the system continuously trains the machine learning model based on the user engagement data to refine at least the cause-user relevance scores and brand-cause compatibility scores. This continuous learning process allows the system to adapt to changing user preferences, emerging trends, and evolving brand-cause relationships.

Figure 3:
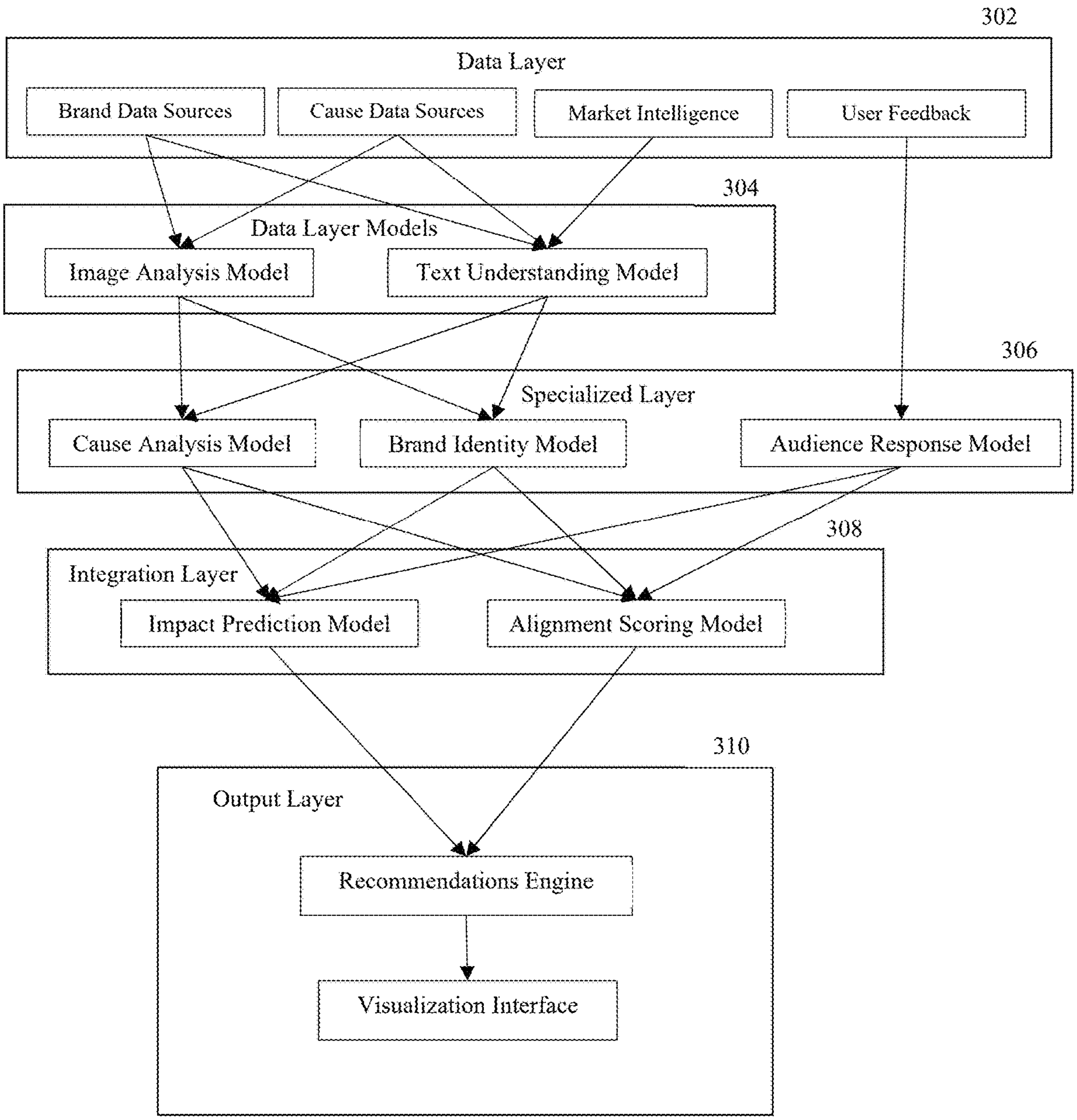
FIG. 3 illustrates one or more layers of multi-layered machine learning model, in accordance with various embodiments of the present subject matter.

FIG. 3 illustrates the above discussed multi-layered machine learning architecture for analysing and aligning brand and cause relationships. The architecture consists of several distinct layers that process different types of data and generate recommendations. The Data Layer forms the top level of the architecture, containing four primary data sources: Brand Data Sources, Cause Data Sources, Market Intelligence, and User Feedback. These sources provide the raw input data for the system. The Base Layer Models contain two fundamental processing components: an Image Analysis Model and a Text Understanding Model. These models process visual and textual information from the data sources above. The Specialized Layer comprises three analytical models: a Cause Analysis Model, Brand Identity Model, and Audience Response Model. These components perform specific analyses on the processed data from the base layer. The Integration Layer contains two models: an Impact Prediction Model and an Alignment Scoring Model. These models combine and analyze the outputs from the specialized layer to generate comprehensive assessments. The Output Layer consists of a Recommendations Engine and a Visualization Interface. The Recommendations Engine processes the integrated analysis results, while the Visualization Interface presents the findings. The diagram shows connections between components across layers, indicating data flow paths through the system. The architecture employs a gradient color scheme from blue to red, with interconnecting lines showing the relationships between different components and layers. The layout demonstrates how data flows from initial sources through various processing and analysis stages to generate final outputs and recommendations. The structure allows for parallel processing while maintaining organized data flow through the system.

Figure 4:
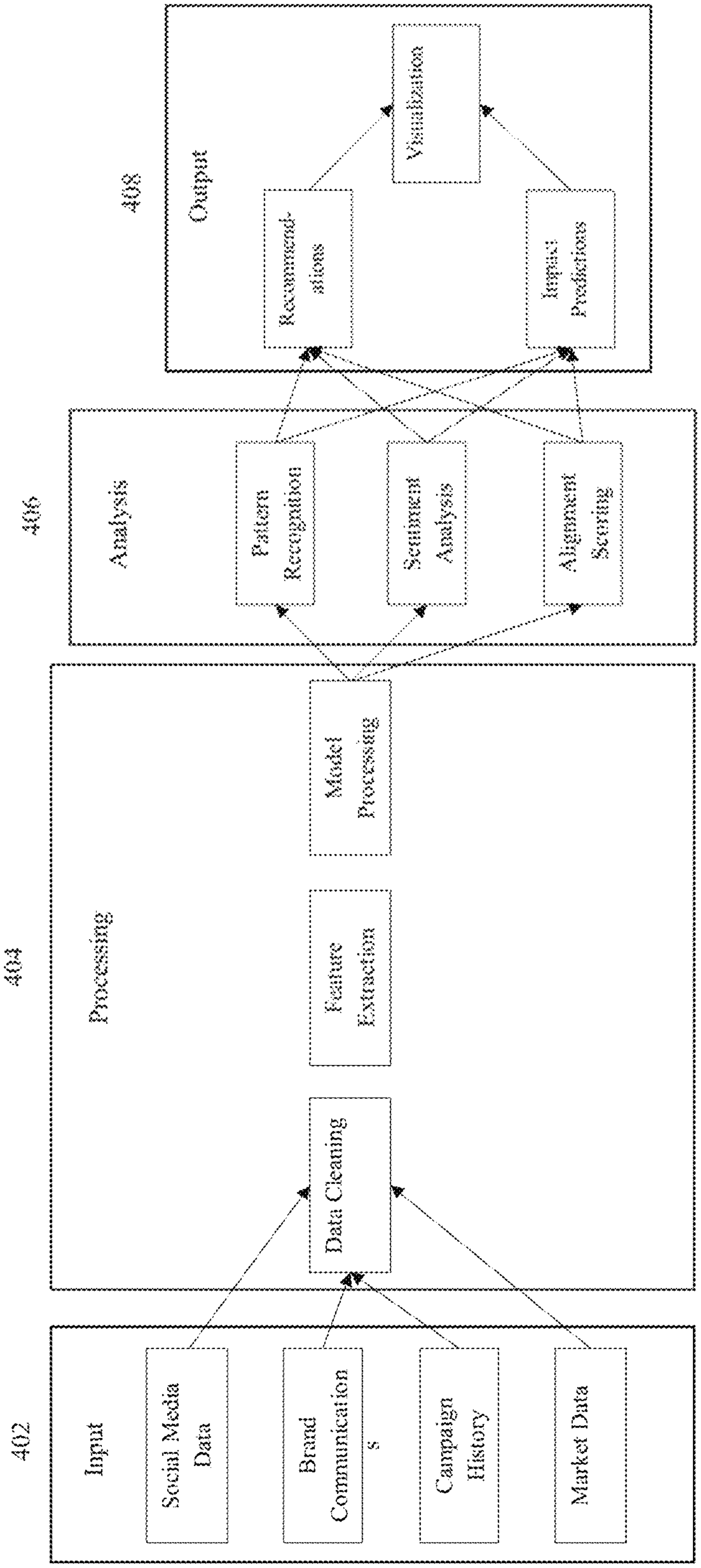
FIG. 4 illustrates input output pipeline, in accordance with various embodiments of the present subject matter.

FIG. 4 illustrates a machine learning system architecture for processing and analyzing brand and cause-related content. The system comprises four main sections: Input, Processing, Analysis, and Output. The Input section contains multiple data sources including social media data, brand characteristics, campaign history, and market data. These sources feed into the Processing section. The Processing section includes two sequential stages: Data Cleaning and Feature Extraction. The cleaned and extracted features then flow into Model Processing, which prepares the data for analysis. The Analysis section contains three parallel processing paths: Pattern Recognition, Sentiment Analysis, and Alignment Scoring. These analytical components process the model outputs simultaneously to generate different types of insights. The Output section includes two components: Recommendations and Impact Predictions. The system combines the analysis results to generate actionable recommendations and predict potential impacts of brand-cause partnerships. The diagram shows data flow connections between sections using directional arrows, indicating how information moves through the system from input to output. The architecture enables parallel processing while maintaining organized data flow through the various analytical components. The system employs a modular design that separates different processing and analysis functions while maintaining integration through clear data pathways. The layout demonstrates how raw data is transformed through various stages into actionable insights and predictions.

A technical challenge in modern computing systems is the real-time delivery of personalized digital content while concurrently processing high-volume, heterogeneous data streams. Typical platforms handle tens of thousands of user requests per second, each triggering the retrieval of diverse data types: (i) structured user profiles, (ii) unstructured text (e.g., product descriptions), (iii) visual media (images or video thumbnails), and (iv) granular user interaction logs (clicks, viewing time, scroll patterns). These data originate from various storage systems-relational databases, object stores, and event streams-necessitating separate processing pipelines for each data set. Conventional systems consolidate these partial results through a computationally intensive join operation, scanning extensive tables and loading large feature vectors into memory. As content catalogues and user bases expand, system performance degrades, compromising real-time personalization capabilities. The claim addresses this issue through 'retrieving, from a pre-computed low-latency lookup table, a plurality of cause records associated with the brand identifier,' which enables faster data retrieval and reduces computational overhead.

To mitigate latency issues, many systems use batch-oriented approaches, pre-computing recommendations at fixed intervals. However, this leads to outdated recommendations and prohibitively expensive real-time model updates. The claim solves this problem by 'continuously training the machine learning model based on the user engagement data to refine at least the cause-user relevance scores and brand-cause compatibility score,' allowing for real-time adaptations to user interests. The absence of an integrated, continuously learning architecture leads to inefficient compute resource use, poor scalability, and delivery of untimely content. The claim addresses these issues through its 'multilayered machine learning model' architecture, which includes a 'sensory layer' for processing diverse data types, a 'cognitive layer' for predicting engagement, and an 'executive layer' for generating compatibility scores. This integrated approach enables efficient processing of heterogeneous data streams and real-time personalization. Furthermore, the claim's method of 'computing . . . a plurality of cause-user relevance scores' and 'selecting a target cause record . . . with a highest cause-user relevance score' enables the delivery of highly relevant, personalized content in real-time. The 'generating, in real-time, the personalized digital content' step directly addresses the challenge of timely content delivery.

By implementing these technical solutions, the claimed method overcomes the limitations of conventional systems. The multi-layered machine learning architecture efficiently processes diverse data types in real-time, while the low-latency lookup table and continuous model training enable rapid, up-to-date content personalization. This approach significantly reduces computational overhead, improves scalability, and ensures the delivery of timely, context-relevant content. The method's ability to process both textual and image data using advanced models like "transformer-based natural language" and "Vision Transformer (ViT) model" further enhances its capability to understand complex, multimodal content. This processing allows for accurate personalization, addressing the challenge of interpreting diverse data types in real-time. Moreover, the system's approach to "tracking user engagement data" and using it for continuous model training creates a feedback loop that constantly improves the accuracy and relevance of the personalized content.

The present invention offers significant advantages in improving computer technology, reducing computational load, and increasing processing speed. These improvements are particularly evident in the context of real-time, personalized content serving in cause-aligned marketing campaigns. The system's architecture and algorithms are designed to optimize computational resources while delivering highly personalized and effective advertisements. By employing a sophisticated caching mechanism, the system significantly reduces the need for repetitive computations. For instance, frequently requested brand-cause combinations are pre-generated and stored, allowing for rapid assembly and delivery of personalized ads without the need to process the entire dataset for each request. This caching strategy substantially decreases the computational load on the servers, resulting in faster response times and reduced power consumption.

Furthermore, the system use of incremental learning in its continuous learning module represents a significant improvement over traditional batch learning approach. Instead of retraining the entire model with each new data point, which would be computationally expensive and time-consuming, the system updates its parameters in real-time based on incoming data. This approach not only reduces the computational load but also ensures that the model remains current without the need for periodic offline retraining sessions that could disrupt service. The system's innovative approach to data normalization and feature selection also contributes to its efficiency. By preprocessing incoming data and selecting only the most relevant features for analysis, the system reduces the dimensionality of the data it needs to process. This reduction in data complexity translates directly into decreased computational requirements and faster processing times.

In addition, the system's use of distributed computing techniques allows for parallel processing of multiple ad requests simultaneously. This architecture enables the system to handle a high volume of requests concurrently, significantly improving its scalability and reducing the time required to serve personalized ads to a large user base. The microdonation feature also demonstrates improved efficiency in financial transactions. By aggregating small donations until they reach a predetermined threshold, the system reduces the number of individual financial transactions that need to be processed. This aggregation not only reduces the computational load associated with processing numerous small transactions but also minimizes transaction fees, making the donation process more cost-effective and environmentally friendly.

Moreover, the system's adaptive learning rates in the continuous learning module represent a significant advancement in machine learning efficiency. By dynamically adjusting the learning rate based on the model's performance and the nature of incoming data, the system optimizes the trade-off between learning speed and stability. This adaptive approach reduces unnecessary computations and helps the model converge faster to optimal parameters, further enhancing processing speed and reducing power consumption. The system's implementation of automated retraining triggers also contributes to its computational efficiency. Instead of adhering to a fixed schedule for model retraining, which could lead to unnecessary computations when the model is performing well, the system intelligently determines when retraining is necessary. This approach ensures that computational resources are only utilized for retraining when there's a significant potential for model improvement, thereby optimizing resource allocation and reducing overall power consumption.

A number of implementations have been described. Nevertheless, it will be understood that various modifications may be made without departing from the spirit and scope of the disclosure. Accordingly, other implementations are within the scope of the following claims.

The invention claimed is:

1. A method for real-time generation of personalized content for a user, the method comprising:

receiving a request comprising a brand identifier and a user identifier;

retrieving, from a pre-computed low-latency lookup table, a plurality of cause records associated with the brand identifier, wherein each cause record in the low-latency lookup table is associated with a brand-cause compatibility score;

computing, using a multilayered machine learning model, a plurality of cause-user relevance scores, wherein each cause-user relevance score represents a relevance between the user identifier and a respective cause record from the retrieved plurality of cause records, wherein the plurality of cause-user relevance scores is computed by:

receiving, via a sensory layer of the multilayered machine learning model, data associated with one or more brands and one or more cause, wherein the received data includes textual data and image data;

processing the textual data and image data to determine context by:

tokenizing the textual data into one or more tokens, generating first feature vectors for the one or more tokens by iteratively refining token embeddings through multiple self-attention layers and feed-forward neural network layers of a transformer-based natural language model;

dividing the image data into fixed-size patches, and generating second feature vectors for the fixed-size patches by encoding patch embeddings through multiple self-attention layers of a Vision Transformer (ViT); and combining the first feature vectors and the second feature vectors into a multimodal context representation;

executing, via a cognitive layer of the multilayered machine learning model, an Audience Response Model comprising a long short-term memory (LSTM) network with an attention mechanism on the multimodal context representation, historical audience response sequences associated with the user identifier, and prior engagement metrics corresponding to similar brand-cause campaigns to generate an engagement likelihood representation indicating predicted audience interaction with each respective cause record;

generating, by an alignment scoring model via an executive layer of the multilayered machine learning model, a brand-cause compatibility score based on the engagement likelihood representation;

selecting a target cause record from the plurality of cause records, wherein the target cause record has a highest cause-user relevance score among the plurality of cause-user relevance scores, and wherein the highest cause-user relevance score exceeds a first predetermined threshold;

generating, in real-time, the personalized digital content for the user identifier, by combining brand related content associated with the brand identifier and cause related content associated with the target cause record;

transmitting the personalized digital content for rendering on a device associated with the user identifier;

tracking user engagement data associated with a personalized advertisement; and continuously training the multilayered machine learning model based on the user engagement data to refine at least the cause-user relevance scores and the brand-cause compatibility score.

2. The method of claim 1, wherein the pre-computed low-latency lookup table is generated by analysing historical brand-cause alignment data.

3. The method of claim 1, wherein the personalized advertisement includes an interactive element that, when activated, triggers a donation to a charitable organization associated with the target cause record.

4. The method of claim 3, further comprising processing, in real-time, a transaction to execute the donation triggered by activation of the interactive element.

5. The method of claim 1, wherein the user engagement data includes at least one of: click-through rates, time spent viewing the advertisement, social media shares, and donation amounts.

6. The method of claim 1, further comprising dynamically adjusting the first predetermined threshold and a second predetermined threshold based on aggregate user engagement data across multiple users and brands.

7. The method of claim 1, wherein the multi-layered machine learning model configured to compute the brand-cause compatibility score, the model comprising:

the sensory layer comprising:

the transformer-based natural language model configured to generate brand embeddings and cause embeddings from textual inputs associated with a brand and a cause; and the vision transformer configured to extract features from visual content associated with the brand and the cause;

the cognitive layer comprising:

a cause analysis model implemented using a graph neural network and configured to process cause-related data and cause inter-relationships; and the audience response model comprising a long short-term memory (LSTM) network with attention and configured to predict engagement likelihood based on historical audience behaviour; and the executive layer comprising:

the alignment scoring model configured to receive the brand embeddings, cause embeddings, and outputs from the cognitive layer, and to compute the brand-cause compatibility score; and an impact prediction model configured to estimate user engagement based on prior campaign performance and contextual variables, wherein the multi-layered machine learning model is trained using labeled brand-cause data and real-time engagement metrics, and wherein the trained multi-layered machine learning model is deployable within a content personalization engine to identify and rank causes aligned with the brand for digital content generation.

8. A system for real-time generation of personalized content for a user, the system comprising:

a processor; and a memory storing instructions that, when executed by the processor, cause the system to:

receive a request comprising a brand identifier and a user identifier;

retrieve, from a pre-computed low-latency lookup table, a plurality of cause records associated with the brand identifier, wherein each cause record in the low-latency lookup table is associated with a brand-cause compatibility score;

compute, using a multilayered machine learning model, a plurality of cause-user relevance scores, wherein each cause-user relevance score represents a relevance between the user identifier and a respective cause record from the retrieved plurality of cause records, wherein the plurality of cause-user relevance scores is computed by:

receiving, via a sensory layer of the multilayered machine learning model, data associated with one or more brands and one or more causes, wherein the received data includes textual data and image data;

processing the textual data and image data to determine context by:

tokenizing the textual data into one or more tokens, generating first feature vectors for the one or more tokens by iteratively refining token embeddings through multiple self-attention layers and feed-forward neural network layers of a transformer-based natural language model;

dividing the image data into fixed-size patches, generating second feature vectors for the fixed-size patches by encoding patch embeddings through multiple self-attention layers of a Vision Transformer (ViT); and combining the first feature vectors and the second feature vectors into a multimodal context representation;

executing, via a cognitive layer of the multilayered machine learning model, an Audience Response Model comprising a long short-term memory (LSTM) network with an attention mechanism on the multimodal context representation, historical audience response sequences associated with the user identifier, and prior engagement metrics corresponding to similar brand-cause campaigns to generate an engagement likelihood representation indicating predicted audience interaction with each respective cause record; and generating, by an alignment scoring model via an executive layer of the multilayered machine learning model, a brand-cause compatibility score based on the engagement likelihood representation;

select a target cause record from the plurality of cause records, wherein the target cause record has a highest cause-user relevance score among the plurality of cause-user relevance scores, and wherein the highest cause-user relevance score exceeds a predetermined threshold;

generate, in real-time, the personalized digital content for the user identifier, by combining brand-related content associated with the brand identifier and cause-related content associated with the target cause record;

transmit a personalized advertisement for rendering on a device associated with the user identifier;

track user engagement data associated with the personalized digital content; and continuously train the multilayered machine learning model based on the user engagement data to refine at least the cause-user relevance scores and the brand-cause compatibility score.

9. The system of claim 8, wherein the pre-computed low-latency lookup table is generated by analysing historical brand-cause alignment data.

10. The system of claim 8, wherein the personalized advertisement includes an interactive element that, when activated, triggers a donation to a charitable organization associated with the target cause record.

11. The system of claim 8, wherein the instructions further cause the processor to process, in real-time, a transaction to execute the donation triggered by activation of the interactive element.

12. The system of claim 8, wherein the user engagement data includes at least one of: click-through rates, time spent viewing the advertisement, social media shares, and donation amounts.

13. The system of claim 8, wherein the instructions further cause the processor to dynamically adjust the predetermined threshold based on aggregate user engagement data across multiple users and brands.

* * * * *